June 4, 1968  A. V. WEASLER  3,386,312
SAFETY CAP FOR THE STUB SHAFT OF A TRACTOR
POWER TAKE-OFF OR THE LIKE
Filed Jan. 10, 1966  2 Sheets-Sheet 1
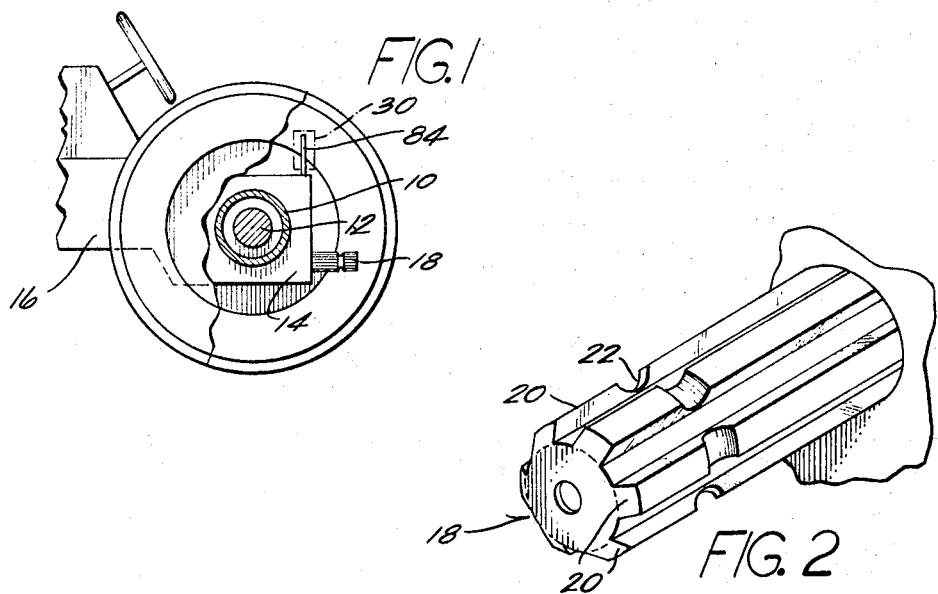
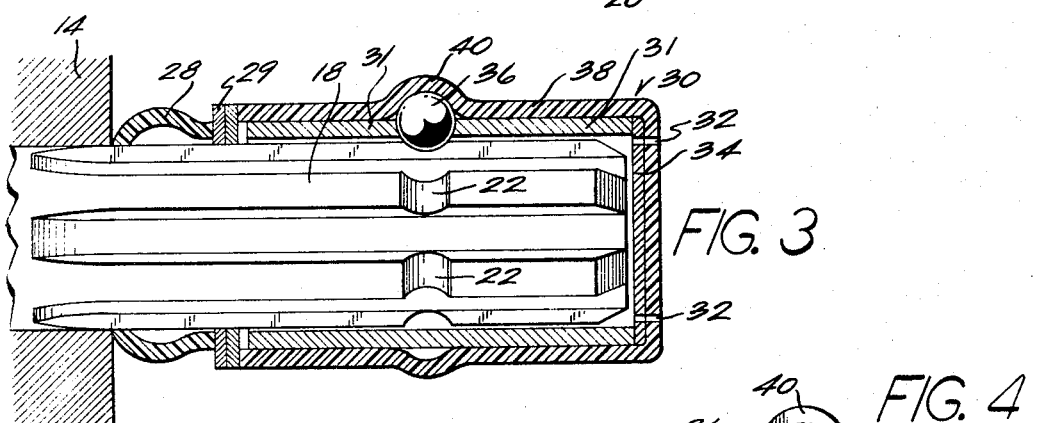
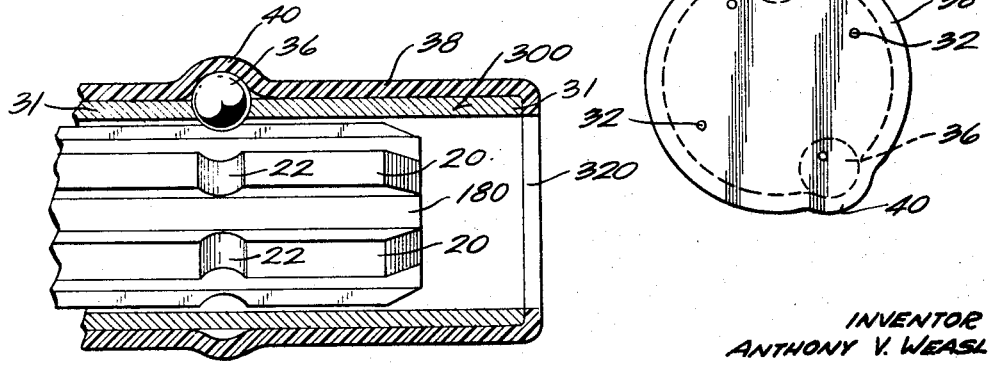
INVENTOR
ANTHONY V. WEASLER
BY
Wheeler, Wheeler & Wheeler
ATTORNEYS INVENTOR
ANTHONY V. WEASLER
By
Wheeler, Wheeler & Wheeler
ATTORNEYS

United States Patent Office 3,386,312
Patented June 4, 1968

3,386,312
SAFETY CAP FOR THE STUB SHAFT OF A TRACTOR POWER TAKE-OFF OR THE LIKE
Anthony V. Weasler, 603 Ridge Road,
West Bend, Wis. 53095
Filed Jan. 10, 1966, Ser. No. 519,803
16 Claims. (Cl. 74—609)

This invention relates to a safety cap for the stub shaft of a tractor power take-off or the like.

As a safety measure, tractors are frequently provided with large guard panels extending transversely across the power take-off shaft to protect the operator against contact with the rotating splined terminal of such a shaft. These guards are so much in the way that they are frequently removed by the user (and in some cases necessarily removed) with ensuing hazard because of the exposed rotating splines.

The present invention contemplates protection of personnel from injury by a splined stub shaft by the application thereto of a cap which is self-contained and, when in use, is entirely retained and supported directly on the shaft itself. The cap completely covers and bears on the splines circumferentially. The cap and the shaft are freely relatively rotatable and the cap has no external surface on which the operator's clothing may be caught. Any contact of the operator with the cap will arrest the movement of the cap. There is so little friction between the cap and the shaft that the cap can remain stationary without appreciably impeding the rotation of the shaft therewithin.

Yet, means is provided for the instant application of the cap to the shaft and instant removal therefrom. In the simplest embodiment, the cap is simply an overended tube of flexible, low-friction material, such as a synthetic resin, having integral internal bosses for engagement in the peripheral channel of the power take-off shaft, the provision of such a channel being conventional to receive coupling of the drive shaft. In other embodiments, the cap has apertures in which retaining balls or springs are yieldably held to engage in the annular channel of the shaft. In still another embodiment, the exposed surfaces of the cap are all metallic and a locking ring slidable axially on the cap is used to release the locking balls, pawls or other detents or to force them into locking engagement in the groove of the power take-off shaft, wherein they can rotate freely with the cap.

In the drawings:

FIG. 1 is a diagrammatic fragmentary view of a rear end portion of the tractor, portions of the tractor axle and near-side wheel being broken away to show the power take-off stub shaft.

FIG. 2 is an enlarged fragmentary detail view in perspective showing the power take-off stub shaft, a portion of the tractor being fragmentarily illustrated.

FIG. 3 is a detail view in axial section through a cap embodying the invention, portions of the stub shaft being shown in elevation and portions of the tractor housing and an auxiliary sleeve being shown in section.

FIG. 4 is a view in end elevation of the cap shown in FIG. 3.

FIG. 5 is a view similar to FIG. 3 showing a slightly modified embodiment of the cap shown in FIG. 3.

Figure 6:
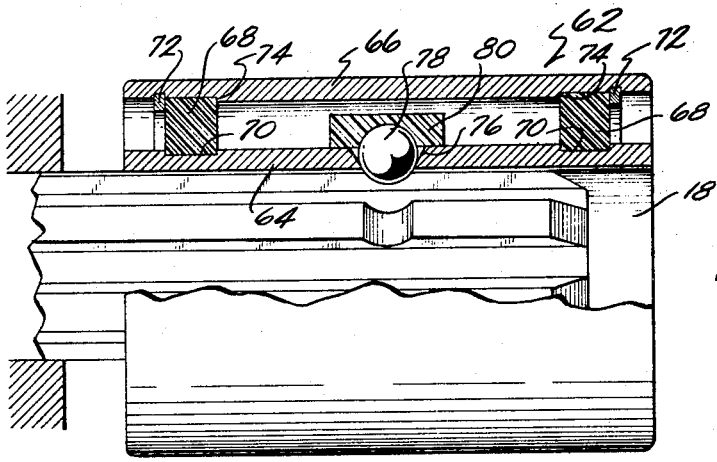
FIG. 6 is a view of another modified embodiment of the cap partially in side elevation and partially in longitudinal section.

The wheel-supported axle 10 contains a live axle 12 which conventionally receives motion through a gear box 14 from a drive shaft (not shown) within the so-called "backbone" fragmentarily illustrated at 16. From the gear box, a power take-off stub shaft 18 projects rearwardly to receive coupling means for driving the various implements which may be powered by the tractor. A detail of this shaft 18 is shown in FIG. 2. Conventionally, it has longitudinal splines 20 intersected by an annular groove 22. It is extremely dangerous for any person to come into contact with such a splined shaft when the shaft is in rotation because it is easy for clothing to become wound thereon and to pull the wearer of such clothing into the machinery.

The present invention comprises a cap which encloses and is entirely mounted on the power take-off stub shaft 18 to bear rotatably on the outer surfaces of the splines. Within it, the stub shaft is freely rotatable. The entire periphery of stub shaft 18 is preferably completely enclosed within the cap. The end is preferably open but if substantially closed, drain holes are preferably provided at 32 in the end wall 34 of the cap. These permit water to drain off so that it will not freeze within the cap to destroy the freedom of rotation of the power take-off shaft therein.

As one example of such a cap having means for releasably holding the cap on the stub shaft, the cap 30 shown in FIG. 3 has sleeve 31 and a ball or balls 36 which extend inwardly part way through holes in the sleeve 31 to engage in the groove 22 of the power take-off shaft 18. The holes are slightly smaller than the ball diameter so that the balls cannot fall through the holes in an inward direction. The inner periphery of sleeve 31 bears rotatably on the exterior surfaces of the splines so that the stub shaft will rotate freely within it. The function of the balls in this device is solely to latch the cap impositively against loss or removal.

In order to withdraw the cap from the stub shaft, it is necessary to displace the balls radially by a camming action for a distance sufficient to enable them to clear the groove 22. They offer sufficient resistance to axle displacement so that a child would have difficulty in withdrawing the cap from the shaft. The balls may be biased into the channel 22 by the tension of a rubber jacket 38 which embraces the sleeve 31 and constitutes the exterior covering of cap 30 in the embodiment of FIG. 3. A slight degree of projection is apparent at 40 where the covering is displaced by one of the balls 36. The bias is readily overcome by an adult who is either pushing the cap into engagement on the shaft or is pulling the cap to withdraw it from the shaft.

In cases in which the stub shaft is 18 is too long to be enclosed entirely within the cap 30, I may mount on the portion of stub shaft which is proximate the tractor housing 14 a short length of rubber tubing 28 which can remain permanently on the shaft and may be splined thereto. If flexible, it will yield axially as shown in FIG. 3 when either a power take-off coupling or the safety cap 30 is engaged with the shaft. Washer or washers 29 may, if desired, be interposed between the cap 30 and the elastomeric sleeve 28. In any case, the sleeve not only adds to the protection but excludes water.

Instead of completely enclosing the metal sleeve portion 31 of cap 30 with the jacket 38 shown in FIG. 3, thereby making it desirable to provide drain holes 32, I may leave the end of the cap 300 completely open as shown at 320 in FIG. 5, preferably extending the length of the sleeve or cap beyond the end 180 of the stub shaft and thereby eliminating the possibility that the stub shaft can catch on a person's clothing.

Any detent impositively engaged in groove 22 may be substituted for the balls.

FIG. 6 shows a cap 62 which has inner and outer concentric sleeves 64 and 66, the latter being rotatably supported from the former by any appropriate bearing means such as the nylon rings 68 which are set into channels 70 in the inner sleeve 64 and are held by the split ring retainers 72 against the shoulders 74 formed by counterboring the outer sleeve 66. The inner ring 64 has openings at 76 through which the retaining balls 78 are projected by the bias of an elastomeric (or any mechanism) spring 80.

With this arrangement, it is entirely immaterial whether the inner sleeve 64 rotates with the stub shaft 18 or is free to turn on the outer periphery of the stub shaft, since the operator can contact only the outer sleeve 66 within which the stub shaft is freely rotatable.

As in the other caps hereinbefore described, it is perfectly possible to close the end of the cap about the end of the stub shaft but, in that event, it is desirable to provide openings for drainage so that water will not freeze within the cap to constrain it to rotate with the stub shaft.

Figure 7:
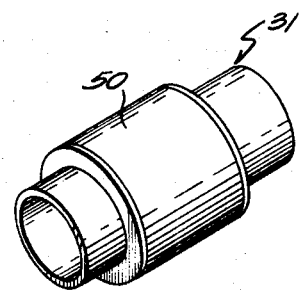
FIG. 7 is a view in perspective showing another embodiment.
Figure 8:
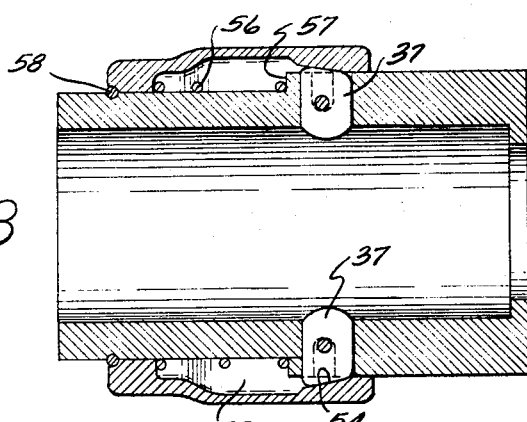
FIG. 8 is a view in axial section through the modified embodiment ilustrated in FIG. 7.

It is also possible to replace the impositive securing means of FIGS. 3 to 6 with a more positive mechanical lock as shown in FIGS. 7 and 8. Instead of balls, the cap here shown has detent dogs 37 of the type shown in my companion application 266,888, filed Mar. 21, 1963, now Pat. No. 3,252,721 and entitled "Slide Lock for Releasably Connecting Shaft Elements." In this instance, a collar 50 reciprocable axially on the outside of the cap has an annular space at 52 which has sufficient radial extent to receive the dogs 37. A conically tapered wedging surface 54 wedges the dogs inwardly into the groove 22 when the dogs register therewith. A spring 56 seated against shoulder 57 biases the collar 50 toward snap ring 58 and into dog-confining position but the cap is instantly released for engagement or disengagement by simply moving the collar axially of the cap against the bias of the spring to relieve the inward pressure on dogs 37.

Figure 10:
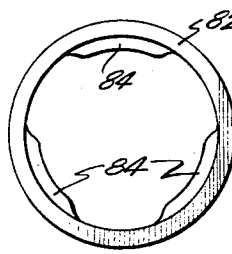
FIG. 10 is a view in end elevation of the cap shown in FIG. 9.
Figure 9:
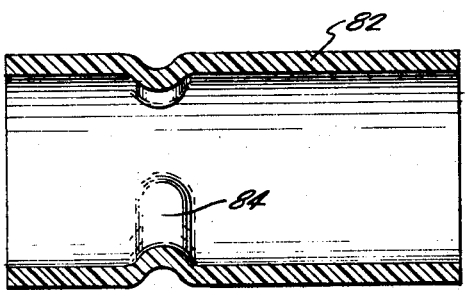
FIG. 9 is a view in axial section through a further modified embodiment of a cap incorporating the invention.

FIGS. 9 and 10 show a construction in which the cap is simply a sleeve 82 which may be made of any appropriate material, a low-friction somewhat elastomeric synthetic resin being preferred. This sleeve is completely open at both ends. It is designed to rotate freely about the splines of the stub shaft and is held thereon by integral internally formed bosses 84 which are releasably engaged in the stub shaft channel 22. The elasticity of the material is adequate to permit these inwardly embossed portions of the sleeve to yield bodily in a radially outward direction when the bosses are moved toward or from the channel 22. This gives complete protection with no moving parts.

Figure 11:
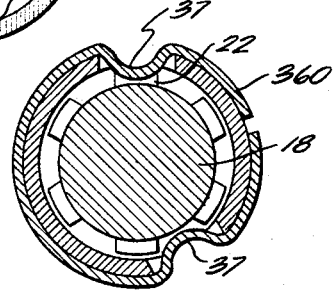
FIG. 11 is a view in transverse section through a further modified embodiment of a cap incorporating the invention, and a shaft upon which it is mounted.

In lieu of the balls 36 which serve as impositive means of holding the cap to the stub shaft, I may use a wire spring 360 which encircles the cap as shown in FIG. 11 and has arcuately offset portions 37 extending through the cap openings into the stub shaft channel 22. Such a device functions similarly to the balls as an impositive detent for holding the cap to the stub shaft.

There are many other possible arrangements but those herein disclosed exemplify my concept of a safety cap self-retained on the shaft which performs no mechanical driving function and at least the exposed surfaces of which do not have splined engagement with the stub shaft, the cap being wholly supported on the shaft when in use. The stub shaft desirably rotates with complete freedom so that the cap will stand still if contacted by a person or animal. In such a case, the person or animal contacting the cap is protected completely from the injury which might result if the person or animal were able to touch the rotating splined power take-off shaft.

The cap may, if desired, be provided with a tether such as a light chain or cord for connecting it with the tractor so that it will be suspended conveniently near at hand when it is not in use on the stub shaft. Alternatively, a peg 84 may be bolted to the tractor as shown in FIG. 1 in a position where the peg projects upwardly so that the cap may simply be sleeved over the peg for storage.

I claim:

1. A cap of the character described for enclosing a power take-off stub shaft to protect against personnel contact therewith, said cap comprising a sleeve having an interior bearing surface in which the stub shaft is freely rotatable, impositive latch means mounted on the sleeve, and an elastomeric jacket encircling the sleeve and latch means and having resilient engagement with the latch means and thereby subjecting the latch means to inward bias.

2. A cap according to claim 1 in which the latch means projects inwardly through apertures with which the sleeve is provided, said means being engageable in a peripheral channel with which the shaft is provided.

3. A cap according to claim 1 which is substantially closed at its end about the end of the shaft.

4. A cap according to claim 1 in which the sleeve has an open end which projects beyond the end of the shaft as a means of rendering the shaft substantially inaccessible.

5. A cap according to claim 1 in which the sleeve has openings and is encircled by a spring having portions projecting inwardly through said openings and yieldably displaceable outwardly.

6. The combination with a tractor having a power take-off stub shaft and a housing from which a coupling end portion of such shaft projects, of a cap for protecting personnel against bodily or clothing contact with the said shaft end when the shaft is in rotation and the coupling is not in use, said cap comprising a sleeve covering and freely rotatable with respect to the coupling end portion of the shaft, and means for holding the cap releasably directly to the shaft while accommodating relative rotation of the shaft with respect to the sleeve.

7. The combination according to claim 6 in which the power take-off stub shaft has an encircling channel and the cap has means intermediate its ends for releasable and rotatable engagement in said channel.

8. The sleeve combination according to claim 6, the cap comprising a sleeve of flexible low-friction material, and the holding means comprising inwardly offset portions integral therewith.

9. The combination according to claim 8 in which said offset portions are arcuately convex axially of the sleeve and have sufficient extent circumferentially to exceed the space between splines of the shaft.

10. The combination with a power take-off shaft having splines with exposed outer surfaces and intersected by an annular groove of concave section, of a protective cap removably self-supported on said shaft, the shaft and cap being freely rotatable relatively to each other, the cap comprising a resiliently yieldable elastomeric jacket, a lining sleeve for said jacket bearing on the said exposed outer surfaces of the splines of said shaft and extending beyond the ends of the splines, detent means disposed in part between the jacket and the lining sleeve and deforming the jacket, said means being subject to the bias of said jacket, the sleeve being apertured to allow the detent means to project therethrough under bias of said jacket into the groove which intersects the splines of the shaft, whereby impositively to lock the cap to the shaft, the jacket having a portion extending about the end of the lining sleeve beyond the end of the shaft.

11. A combination according to claim 10 in which the detent means comprises at least one ball for which the sleeve has an opening of less diameter than the ball.

12. A combination according to claim 10 in which the power take-off shaft is encircled by an elastomeric collar, and washer means interposed between said collar and said cap, said collar being slightly compressed axially deformed when said cap is engaged with said shaft.

13. Means for protecting personnel from being injured by bodily or clothing contact with a rotating splined power take-off stub shaft having intermediate its ends a spline-encircling annular groove and designed to receive a power take-off coupling and exposed when no coupling is attached thereto, such means comprising a cap readily applicable and removable manually without tools for external bearing contact with the splines and within which the stub shaft is freely rotatable, and retaining means wholly on said cap at a point remote from both ends thereof for engagement in said annular groove for releasably holding the cap to the stub shaft to be entirely supported therefrom, said retaining means being yieldable radially outwardly to clear said groove and said cap having means for holding said retaining means in said groove for securing the cap to the shaft.

14. A means according to claim 13 in which the cap comprises a sleeve having apertures through which balls on the exterior of the cap partially project inwardly of the cap and constitute the retaining means for releasably holding the cap to the stub shaft having the peripheral groove in which the respective balls are receivable, said means for holding said retaining means comprising means externally of the balls for holding them in the apertures.

15. A means according to claim 13 which the cap comprises inner and outer sleeves, the inner one of which is provided with the retaining means for releasably holding the cap in position and the outer of which is freely rotatable with respect to the said inner sleeve.

16. A means according to claim 13 in which the holding means for said retaining means comprises a slide lock mechanism including a locking sleeve reciprocable axially on the cap, and the retaining means being carried by the cap within the sleeve and with which the sleeve has engagement in one direction of sleeve reciprocation for holding said retaining means in said peripheral channel with which the stub shaft is provided.

References Cited

UNITED STATES PATENTS

| | | | |
|---|---|---|---|
| 1,499,694 | 7/1924 | Rogers | 74—609 X |
| 2,451,440 | 10/1948 | Lidington | 74—609 |
| 3,290,960 | 12/1966 | McCay | 74—527 |

MILTON KAUFMAN, *Primary Examiner.*

UNITED STATES PATENT OFFICE
CERTIFICATE OF CORRECTION

Patent No. 3,386,312                          June 4, 1968

Anthony V. Weasler

It is certified that error appears in the above identified patent and that said Letters Patent are hereby corrected as shown below:

Column 1, line 71, "ilustrated" should read -- illustrated --. Column 2, line 59, cancel "is", first occurrence. Column 4, line 47, cancel "sleeve".

Signed and sealed this 7th day of October 1969.

(SEAL)
Attest:

Edward M. Fletcher, Jr.                          WILLIAM E. SCHUYLER, JR.
Attesting Officer                                    Commissioner of Patents